(12) United States Patent
Auriol et al.

(10) Patent No.: US 7,882,981 B2
(45) Date of Patent: Feb. 8, 2011

(54) DEVICE FOR STORING AND DISPENSING PARTS IN PARTICULAR RIVETS

(75) Inventors: Jean Marc Auriol, Les Blanches, 31130 Flourens (FR); Philippe Bornes, La Madeleine, 31130 Flourens (FR)

(73) Assignees: F2 C2 System, Flourens (FR); Jean Marc Auriol, Flourens (FR); Philippe Bornes, Flourens (FR)

( * ) Notice: Subject to any disclaimer, the term of this patent is extended or adjusted under 35 U.S.C. 154(b) by 856 days.

(21) Appl. No.: 10/520,762

(22) PCT Filed: Jul. 11, 2003

(86) PCT No.: PCT/FR03/02201

§ 371 (c)(1),
(2), (4) Date: Jul. 25, 2005

(87) PCT Pub. No.: WO2004/007142

PCT Pub. Date: Jan. 22, 2004

(65) Prior Publication Data

US 2005/0284827 A1     Dec. 29, 2005

(30) Foreign Application Priority Data

Jul. 12, 2002   (FR) .................................. 02 08864

(51) Int. Cl.
B65G 51/02 (2006.01)
B65H 3/08 (2006.01)
(52) U.S. Cl. ....................... 221/278; 221/241; 221/197; 406/2

(58) Field of Classification Search ...................... 406/4, 406/1, 2, 3; 221/241, 197, 278; 193/14, 193/15, 23, 29
See application file for complete search history.

(56) References Cited

U.S. PATENT DOCUMENTS 5,480,062 A * 1/1996 Rogers et al. ................ 221/174

FOREIGN PATENT DOCUMENTS

| EP | 0 511 093 A | 10/1992 |
|---|---|---|
| EP | 0 536 779 A | 4/1993 |
| EP | 0 618 022 A | 10/1994 |
| EP | 0 995 537 A | 4/2000 |
| WO | WO 91 18695 A | 12/1991 |
| WO | WO 95 34391 A | 12/1995 |
| WO | WO 00 07751 A | 2/2000 |

* cited by examiner

Primary Examiner—Michael Safavi
(74) Attorney, Agent, or Firm—Akerman Senterfitt; Peter A. Chiabotti

(57) ABSTRACT

The invention concerns a device for storing and dispensing (D) parts such as rivets comprising a frame (100) provided with zones for receiving (100') cartridges (200) for storing parts such as rivets displaced by a transporting fluid. The invention is characterized in that it comprises a mobile dispensing head (300) for gripping and evacuating in single units parts stored in the cartridge (200) in front of which it is urged to be placed, said mobile head being associated with a plurality of dispensing tubes (310) whereof the diameter corresponds to the type of parts to be dispensed. The invention is applicable to storage and dispensing of parts such as rivets.

8 Claims, 2 Drawing Sheets

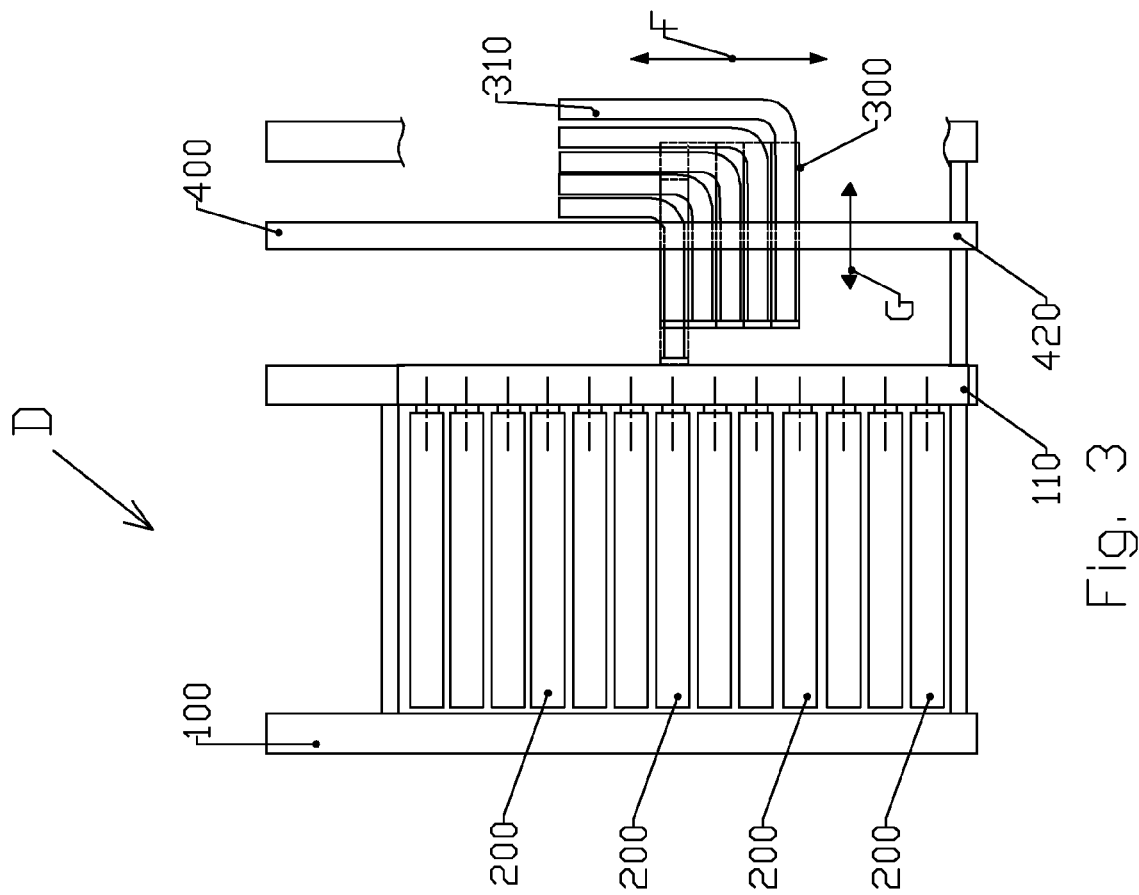
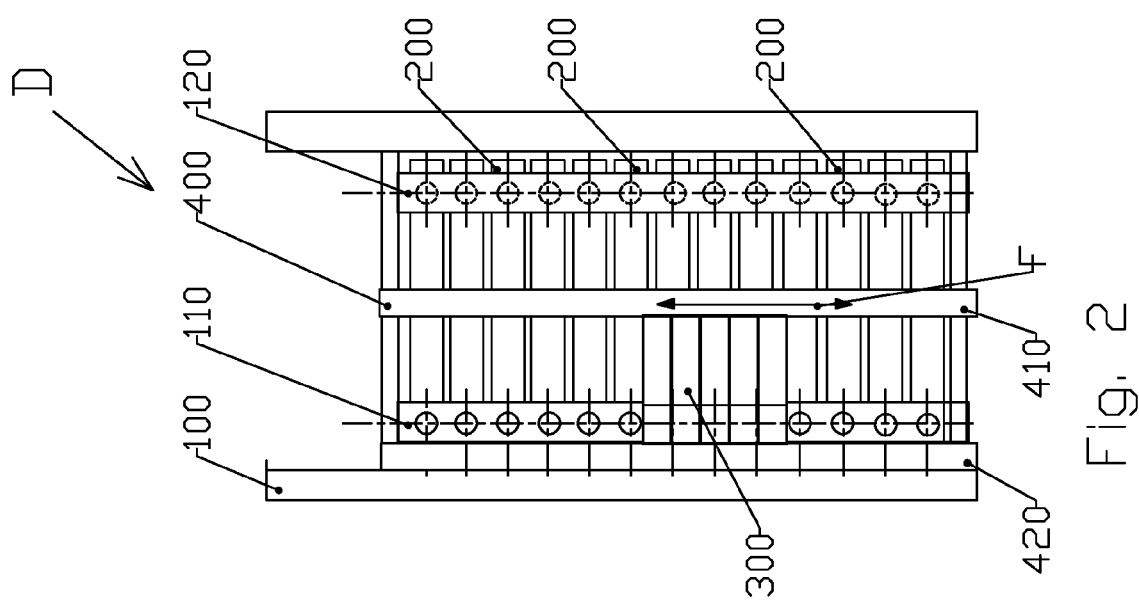

ate to the said tool and of which the other end is associated for each tube to a different cartridge comprising a mechanism for freeing the said parts, the said cartridge cooperating with the said storage sub-assembly.

DEVICE FOR STORING AND DISPENSING PARTS IN PARTICULAR RIVETS

BACKGROUND OF THE INVENTION

1. Field of the Invention

This invention relates to the field of storage and distribution of parts, and in particular the adaptations permitting, in the best possible conditions, the storage and distribution of parts such as rivets for a tool such as a drilling/riveting head.

2. Description of the Prior Art

There exists, in the prior art, several means of storing, selecting and distributing rivets, such as those described in particular in the documents EP 0 855 236, EP 0 373 685, WO 95/34391 and WO 91/18695.

There exists in particular in the prior art as described in the European application n° EP 0 511 093, storage and distribution devices for parts such as rivets which, receiving in different cartridges the rivets stored by type or category, satisfy the requirement and by means of a carrying fluid such as compressed air, the unitary distribution of the rivet required by the actuator such as a drilling/riveting head connected to the said device.

The applicants remarked that the storage devices described in the documents mentioned above often required directional kinematics of the part for each cartridge and therefore for each type of rivet, before its arrival in the distribution module, the immediate consequence of which is to increase the cost of such a device. Furthermore, the disadvantage of the said kinematics is that it is only suited to a single type of part, obliging the users to use the position of the corresponding cartridge only for a single type of rivet, which unavoidably causes a lack of flexibility of the distribution device.

The applicants also remarked that the succession of operations of unitary distribution, orientation and feed to the actuator caused additional time for each operation so that a particularly long distribution time for the parts was obtained.

There also exists in the prior art a global feed system composed of attachment elements of an attachment element adjustment tool described in the international application n° WO 00/07751, whose main specific feature is to propose a buffer tank of attachment elements attached to the tool, the feed tube that is capable of filling the said buffer tank being removable to permit the movement of the tool with the said buffer tank. In this document, there are also described several functional sub-assemblies, for the storage and distribution of attachment elements. In this way, for example, one of the sub-assemblies illustrated is composed of a storage and distribution device for parts such as rivets, of the same type as that with a body equipped with zones to accommodate storage containers for parts such as rivets, all orientated in the same way, which may be moved by means of a transport fluid.

The said containers may be stacked and positioned in rows and columns, and a carriage comprising a mechanism for freeing the parts is associated to each column. This carriage moves a distribution tube thus moving the part(s), from the storage container to the distribution tube. This carriage may move in a displacement plane, which is to say in two axes. The containers may store different rivets by row or by column, each column and each associated distribution tube being capable of supplying a different rivet from the adjacent column or tube. In this way, the system described in this application proposes joining a sub-assembly for storing parts such as rivets in the form of containers with all of the parts contained being orientated in the same way, capable depending on the container of storing different rivets from one container to the next to a adjustment/user tool of the said parts by means of a distribution tube system of which a first end is attached to but can be removed from the said tool and of which the other end is associated for each tube to a different cartridge comprising a mechanism for freeing the said parts, the said cartridge cooperating with the said storage sub-assembly.

Another distributor described in the European application n° EP 0 536 779 proposes, from the inlet end of the two tubes, aligning the inlet end of a single distribution tube that communicates with the applicator. Apart from the limited mobility of the inlet end with respect to the inlet ends (the movement is limited to a simple back and forth motion), this distributor only proposes a single distribution tube at the moving part level, as for the device described in the international application n° WO 00/07751. Consequently, as part of an application of the distribution of parts that are too different, this single tube cannot alone feed the applicator effectively in good conditions.

The same is also true for the mobile selection means described in the international application n° WO 95/34391, that is only associated to a single tube.

SUMMARY OF THE INVENTION

Based on these facts and in order to satisfy further the specific criteria of the distribution of parts such as rivets, the applicants have carried out research on a new storage and distribution device for parts such as rivets, to reduce the manufacturing costs of such a device as well as the time required to distribute the parts by this type of device.

This research has led to the designing of a storage and distribution device for parts such as rivets, greatly simplified and much quicker whilst overcoming the previously mentioned disadvantages.

The storage and distribution device for parts such as rivets of the invention is of the same type as that with a body equipped with zones to accommodate storage containers storage for parts such as rivets moved by means of a transport fluid.

According to the main characteristic of the invention, the device is remarkable in that it comprises at least one mobile distribution head which unitarily collects and evacuates the parts stored in the cartridge in front of which it positions itself, the said mobile distribution head being associated to a number of distribution tubes whose diameter corresponds to the type of parts to be distributed.

This characteristic is particularly advantageous in that it uses a single mobile distribution head for a number of cartridges, which allows the kinematics of the previous art to be economized as well as the duration of its implementation during operation.

Consequently, by creating such a storage and distribution device comprising a mobile distribution head avoiding the presence of the system for orientating the part which allowed the link to be made between the storage module and the distribution module, the applicants have imagined a new mode of storage and distribution permitting the disadvantages of the prior art to be overcome.

In spite of the multiplicity of the types of rivets and the variation of the positioning of their storage container, the mobile distribution head of the invention itself permits the parts to be distributed, where in the prior art several carriages were required. The kinematics and means moved are greatly simplified.

If the carriage described in the international application n° WO 00/07751 may be similar to the moving distribution head of the invention, and if the stacked containers may be similar to the said cartridges described, it appears that the mobile distribution head of the invention is associated to a number of distribution tubes whose diameter corresponds to the type of parts to be distributed, which is to say that the distribution tubes have different internal diameters and possibly internal profiles depending on the part to be distributed. In fact, to permit a correct movement to be started and therefore correct distribution of the part extracted from the cartridge in which it was stored, the communication tubes between the device and the applicator to which it is connected must be adapted to the diameter and/or the shape of the part. These distribution tubes are advantageously made from a flexible material that permits them to ensure flexibility and a movement channel for the part regardless of the position of the mobile distribution head.

The fundamental concepts of the invention that have just been described as well as other characteristics and advantages will become clear upon reading the following description and in relation to the appended figures, of an embodiment of a storage and distribution device for parts such as rivets.

BRIEF DESCRIPTION OF THE DRAWINGS

FIG. 2 is a front elevation diagrammatic drawing of an embodiment of the device illustrated in FIG. 1.

FIG. 3 is an elevation diagrammatic drawing of the embodiment of the device illustrated in FIG. 1.

DETAILED DESCRIPTION BASED ON THE DRAWINGS

Figure 1:
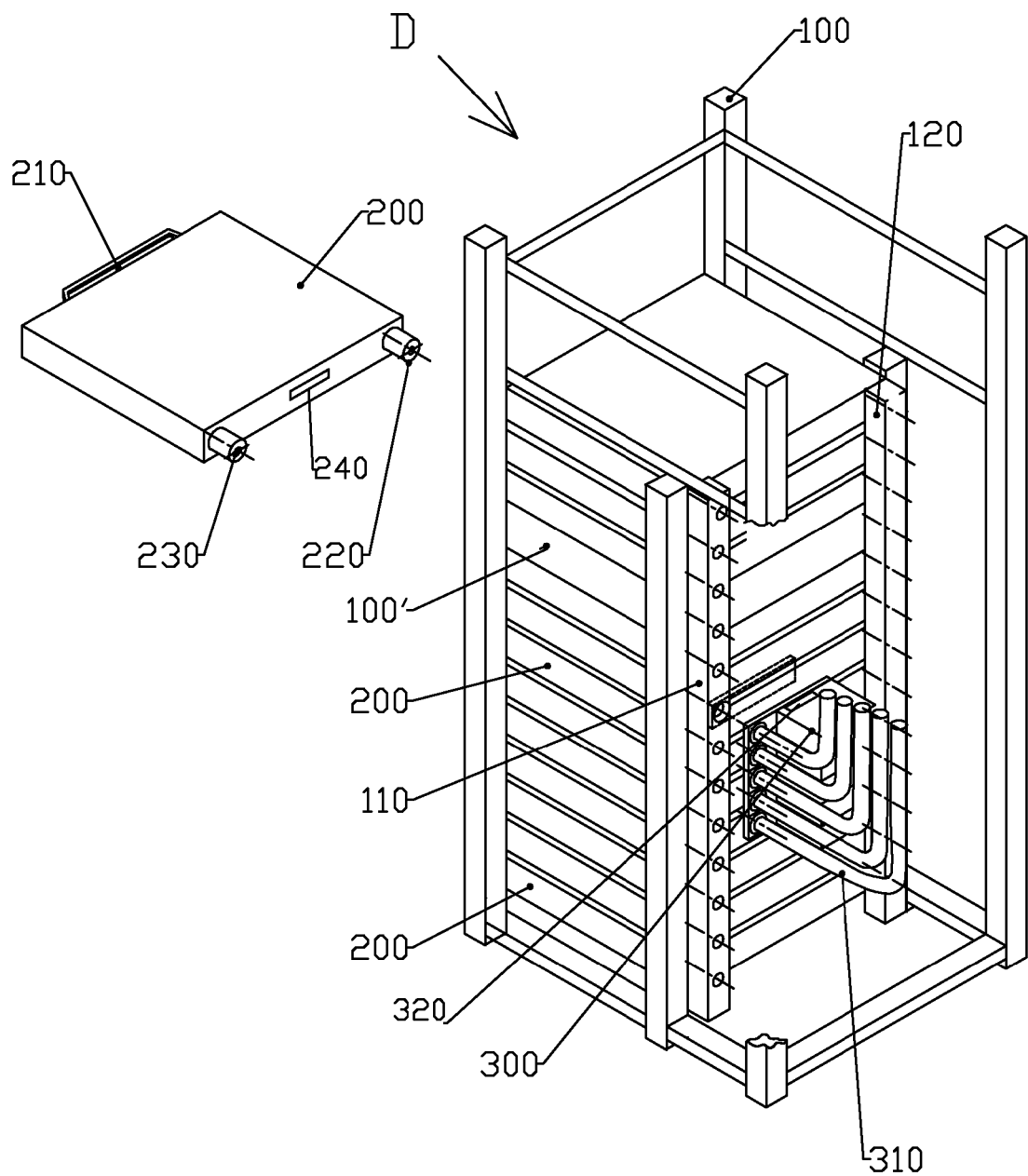
FIG. 1 is a perspective diagrammatic drawing with a partially exploded view of an embodiment of a device in compliance with the invention.

As illustrated in the drawing of FIG. 1, the storage and distribution device for parts such as rivets whose assembly has the reference D is of the type comprising a body 100 equipped with receiving zones 100' to accommodate rivet storage cartridges 200 supplied with a transport fluid and in front of which moves a mobile distribution head 300.

According to the embodiment illustrated, these part storage cartridges 200 are advantageously composed of a parallelepiped equipped with a carrying handle 210 and at least one transport fluid inlet orifice 220 and at least one stored part outlet orifice 230. Each cartridge 200 provides the storage for a single type of rivet inside a storage tube coiled inside the latter. According to the embodiment illustrated, the cartridges 200 have the same external dimensions in order to adapt and be housed in any of the accommodation zones in the body 100 of the device D.

According to another embodiment, a single orifice 230 is used both for the outlet of the stored parts and for the introduction of the transport fluid inside the cartridge 200.

According to the non-restrictive embodiment illustrated, the receiving zones 100' in the body 100 for the cartridges 200 are positioned so that the cartridges 200 form a vertical column permitting a same vertical plane to be used to position the axes of the compressed air inlets 220 and in a second vertical plane the axes of the stored element outlet orifices 230. These receiving zones 100' each have positioning means and positioning hold means that facilitate the interchangeability of the cartridges.

Each cartridge 200 is moreover associated to a wait chamber that authorizes the unitary exit of the stored parts and with which the mobile distribution head 300 communicates. These wait chambers are, according to the illustrated embodiment, grouped in a same vertical beam 110 joined to the body 100 of the device D.

Furthermore, each cartridge 200 is associated at its transport fluid orifice 220 with a transport fluid feed point connected to the body 100. These feed points are, according to the embodiment illustrated, grouped in a same vertical beam 120 joined to the body 100 of the device D.

According to another embodiment, the cartridges 200 communicate with a single beam 110 controlling both the output of the stored parts and the input of the transport fluid.

In this arrangement, each cartridge 200 that is installed in the body 100 has a chamber controlling the outlet of the stored parts as well as a transport fluid feed source guaranteeing the movement of the stored parts.

The transport fluid is, according to one commonly used embodiment, compressed air which by permanently supplying the storage modules formed by the cartridges, ensures that the elements stored can leave when authorized. This transport fluid moves the stored parts inside the cartridges and positions them one by one, progressively as they are freed in the wait chamber provided for this purpose and aligned in the column 110.

According to one particularly advantageous characteristic of the invention, the device D is equipped with a mobile distribution head 300 which unitarily collects and evacuates the parts stored in the cartridge 200 in front of which it positions itself, this part then being moved by means of the transport fluid to be sent to the applicator that has requested it.

As illustrated in FIGS. 2 and 3, this mobile distribution head 300 is associated to a logic structure 400 creating a displacement plane of the mobile distribution head 300 in front of the cartridges 200. In this way, even though the embodiment illustrated has a mobile distribution head 300 that is mobile in a single axis, the position of the cartridges 200 and the associated logic structure 400 may consequently have the mobile distribution head 300 move in two axes without this being out of the field of the invention.

This logic structure 400 is advantageously represented by two vertical beams 410 and 420 and guarantees movement and/or the guiding of the mobile distribution head 300 in a vertical axis according to the double arrow F. The use of this vertical movement is to enable the mobile distribution head 300 to move from one cartridge 200 to another.

According to another preferred embodiment, one of the beams (410 or 420) moves the mobile distribution head 300 whilst the other beam provides translation guidance.

According to one embodiment, the mobile distribution head 300 is moved according to the double arrow F by a step motor which permits the mobile distribution head 300 to be positioned correctly when the latter has to be moved to a precise location in front of the column of cartridges 200.

According to another embodiment, the mobile distribution head 300 is moved according to the double arrow F by a linear motor. According to other embodiments, the said movement is carried out by a pneumatic actuator or a brushless type motor.

In compliance with the invention, the said mobile distribution head 300 is associated to a number of distribution tubes 310, whose diameters correspond to the type of the parts to be distributed. In fact, to authorize correct movement and thus correct distribution of the part extracted from the cartridge 200, the communication tubes 310 between the device D and the applicator to which it is connected, must be suited to the diameter of the stored part. These distribution tubes 310 of the mobile distribution head 300 are advantageously made from a flexible material that permits them to ensure flexibility and a movement channel for the stored part regardless of the position of the mobile distribution head 300. In this way, when the device D is associated to an applicator, depending on the diameter of the part required by the applicator, the mobile distribution head 300 places the end of a single tube 310 of a suitable diameter in front of the outlet orifice 230 of the cartridge 200 stocking the required parts. Consequently, to guarantee this function, the tubes 310 associated to the mobile distribution head 300 have different diameters and/or profiles, and the mobile distribution head 300 ensures the movement of one of their ends.

For reasons of clarity, only the end connected to the mobile distribution head 300 of the distribution tubes 310 has been illustrated in FIGS. 1 and 3. The second end of the distribution tubes 310 may be indifferently connected to the same applicator or connected to different applicators.

These distribution tubes 310 are positioned in parallel to the axes of the outlet orifices 230 of the cartridges 200 storing the parts to be distributed. Via movement of the mobile distribution head 300, the distribution tubes 310 are positioned co-axially to the axes of the outlet orifices 230. More precisely, the end of a distribution tube 310 is positioned coaxially to the axes of the outlet orifices 230.

As illustrated in FIGS. 1 and 3, the distribution tubes 310 move from a position in front of the cartridges 200 by means of the mobile head 300 to a position where one of their ends communicates with the cartridge 200 containing the parts to be distributed and vice versa according to the double arrow G (see FIG. 3).

This movement is advantageously carried out by a moving means of jack type fitting to each tube 310 connected to the said mobile head 300. In this way, when a particular part has to be distributed, the mobile distribution head 300 is moved vertically along the beams 410 and 420 according to the double arrow F to position a suitable distribution tube 310 coaxially to the outlet orifice 230 of the storage cartridge 200, which contains the particular required part. Once positioned coaxially, the end of the tube 310 is moved horizontally by means of its actuator according to the double arrow G so that it is introduced in the corresponding direction.

In this way, the mobile distribution head 300 is fitted out so that it can accommodate the horizontal movement means for each distribution tube 310 for which it moves the end vertically.

These distribution tube ends 310 are advantageously equipped with a self-centering taper so that it is easier to insert them into the bank.

Even though illustrated the logic structure 400 proposes only one movement according to the two axes symbolized by the two double arrows F and G, it may be perfectly envisaged to create a device D that adopts a logic structure 400 offering three movement axes, without this being excluded from the field of the invention increasing by this means the displacement plane. Of course, this additional movement is only justified in the case of the storage module being composed of not just a single column of cartridges 200 but a number of columns, thus offering a wide choice of parts to be distributed. In this case, the body 100 of the device D is preformed to accommodate and form the said columns.

The number of cartridges 200 as well as the number of distribution tubes 310 complicate the orientation of the mobile distribution head 300. Therefore, the cartridges 200 can be each equipped with an identification label 240 with means of identification cooperating with one or more identification label readers 320 associated to the mobile distribution head 300 so that the mobile distribution head 300 can position the end of the correct distribution tube 310 coaxially to the outlet orifice 230 of the correct cartridge 200. Consequently, the cartridges 200 may be stored in any order in the device D, as the identification label readers 320 associated to the mobile distribution head 300 permits the mobile distribution head 300 to move into the correct position and use the correct distribution tube 310.

Similarly, by means of the said identification labels 240, a CPU manages the stocks and the changing of the cartridges 200. In fact, each part distributed may thus be counted which means that the renewal of the cartridges 200 can be managed in advance.

Furthermore, the device D of the invention permits the positions used for the cartridges 200 to be non-dedicated to a single type of part to be distributed, which allows avoiding changing the program each time that the position of a particular type of part is changed. The identification process thus allows the improvement not only of the flexibility of the distribution device D but also the traceability of the components distributed.

It can be understood that the device that has just been described above and represented, has been done so more to divulge it than to restrict it. Of course, various fittings, modifications and improvements could be made to the above example, without this leaving the field of the invention as defined in the claims.

What is claimed is:

1. A storage and distribution device for parts, comprising:
   a storage cartridge body having receiving zones for receiving parts storage cartridges with an identification label, wherein the parts storage cartridges are interchangeable in different receiving zones;
   at least one mobile distribution head coupled to the body, the mobile distribution head having an identification label reading head;
   distribution tubes coupled to the mobile distribution head, each distribution tube having a diameter that corresponds to a diameter of the parts to be distributed; and
   wherein the mobile distribution head is configured to position an end of a distribution tube coaxially to an outlet of a storage cartridge identified with the identification label reading head as containing a particular part such that the particular part can be evacuated from the storage cartridge and moved through the distribution tube.

2. The device according to claim 1, wherein the mobile distribution head is associated to a logic structure creating a displacement plane of the mobile distribution head in front of the storage cartridges.

3. The device according to claim 1, wherein according to the diameter of the required part, the mobile distribution head positions an end of a distribution tube of a suitable diameter in front of the outlet of the storage cartridge storing the required parts.

4. The device according to claim 1, wherein the storage cartridges have a stored part outlet orifice, wherein the distribution tubes coupled to the mobile distribution head are positioned parallel to axes of the outlet orifices of the storage cartridges; and
   wherein the mobile distribution head can move such that the distribution tubes are positioned coaxially to the axes of the outlet orifices.

5. The device according to claim 1, wherein the distribution tubes are moved by means of the mobile distribution head to a position where at least one end of at least one distribution tube communicates with a storage cartridge containing the parts to be distributed.

6. The device according to claim 1, wherein each storage cartridge is connected to a wait chamber that authorizes the unitary exit of the parts stored in the storage cartridge and with which the mobile distribution head communicates.

7. A storage and distribution device for parts, comprising:
a plurality of storage cartridges for the parts, the storage cartridges having an identification label;
a storage cartridge body equipped with zones for receiving the storage cartridges, wherein the storage cartridges are interchangeable in different zones;
at least one mobile distribution head coupled to the body, the mobile distribution head having an identification label reading head;
a plurality of distribution tubes coupled to the mobile distribution head, the distribution tubes having a storage cartridge connecting end and a dispensing end, and whose diameters correspond to diameters of the parts to be distributed; and
wherein the mobile distribution head is configured to position at least one of the storage cartridge connecting ends of the distribution tubes coaxially with an outlet of a storage cartridge identified with the identification label reading head as containing a particular part with a diameter that corresponds to the diameter of the distribution tube, such that the particular part can be evacuated from the storage cartridge and moved through the distribution tube with a transport fluid.

8. The device according to claim 7, wherein each storage cartridge is connected to a wait chamber that authorizes the unitary exit of the parts the storage cartridge stores and with which the mobile distribution head communicates.

* * * * *